United States Patent [19]

Schütz et al.

[11] Patent Number: 4,535,964
[45] Date of Patent: Aug. 20, 1985

[54] VIBRATION DAMPED SUSPENSION FOR A DRIVE AGGREGATE OF A MOTOR VEHICLE IN A BODY STRUCTURE

[75] Inventors: Matthias Schütz, Mundelsheim; Rolf V. Sivers, Rutesheim; Dirk Roesems, Nussdorf; Rolf Rebmann, Stuttgart, all of Fed. Rep. of Germany

[73] Assignee: Dr. Ing. h.c.F. Porsche A.G., Fed. Rep. of Germany

[21] Appl. No.: 491,449

[22] Filed: May 4, 1983

[30] Foreign Application Priority Data

May 7, 1982 [DE] Fed. Rep. of Germany ....... 3217171

[51] Int. Cl.³ ............................................. F16M 13/00
[52] U.S. Cl. ................................... 248/607; 180/299; 248/608
[58] Field of Search ............... 248/607, 605, 606, 608, 248/609; 180/299, 58

[56] References Cited

U.S. PATENT DOCUMENTS

| | | | |
|---|---|---|---|
| 1,975,960 | 10/1934 | Lee | 248/607 |
| 2,044,023 | 6/1936 | Trott | 248/607 |
| 2,063,064 | 12/1936 | Trott et al. | 248/605 |
| 2,135,785 | 11/1938 | Ballman | 248/607 |
| 2,378,874 | 6/1945 | Trott | 248/607 |
| 2,575,858 | 11/1951 | Bennett | 248/606 |
| 3,329,230 | 7/1967 | De Castelet | 248/609 |
| 3,330,515 | 7/1967 | Janssen et al. | 248/606 |
| 4,320,814 | 3/1982 | Middelhoven | 180/299 |

Primary Examiner—William H. Schultz
Assistant Examiner—Ramon O. Ramirez
Attorney, Agent, or Firm—Craig and Burns

[57] ABSTRACT

A vibration-damped suspension of a drive aggregate in the body structure includes a forward and rear bearing installation; the forward bearing installation supports the transmission by way of two bearing supports whereas the rear bearing installation includes a cross-bearer supported on the side of the body by way of lateral outwardly arranged bearing supports. The cross-bearer is connected with a bracket receiving the engine by interposition of a decoupling device, whereby the bracket is decoupled from torsional stresses of the body so that the drive aggregate stands completely quiet notwithstanding twisting of the body.

23 Claims, 4 Drawing Figures

VIBRATION DAMPED SUSPENSION FOR A DRIVE AGGREGATE OF A MOTOR VEHICLE IN A BODY STRUCTURE

The present invention relates to a vibration damped suspension for a drive aggregate of a motor vehicle in a body structure having a bearing installation arranged in a forward area of the aggregate as well as by way of a further bearing installation arranged in a rear area of the aggregate.

In a motor vehicle, especially of convertible type of construction, natural vibrations of the body occur in the rear area, which appear as torsional vibrations about the vehicle longitudinal axis and as bending or flexural vibrations about the vehicle transverse axis. The torsional vibrations become effective in a disadvantageous manner in particular, on a bearing installation for a drive aggregate arranged in the rear section of the vehicle. As a result of this form of vibrations, the body structure twists about the nearly rigid drive aggregate and seeks to rotate the same. It is known to retain the drive aggregate on bearing installations in the forward and rear area of the rear body structure. The rear bearing installation is connected with the engine and includes a cross bearer, which receives the engine by way of a bracket rigidly connected therewith. The occurring torsional moment is nearly completely transmitted onto the drive aggregate by way of the cross bearer and the bracket. This rigid coupling of the aggregate to the body structure entails the significant disadvantage that the rigid connection between the aggregate and its bearing installation is subjected to strong loads and stresses which lead to damages and do not assure a durable connection between the cross bearer and the drive aggregate. Additionally, the rigid coupling leads to cracks in the exhuast gas installation as well as to damages of the gasoline lines.

The present invention is therefore concerned with the task of providing a vibration-damped suspension for a drive aggregate in a motor vehicle which avoids damage to the bearing installation of the drive aggregate initiated by torsional and/or flexural vibrations.

The underlying problems are solved according to the present invention in that the cross bearer is connected with a bracket retaining the engine under interposition of at least one dynamic uncoupling device in such a manner that the uncoupling device permits a relative movement of the vehicle body independently of the drive aggregate in a defined manner.

The advantages achieved with the present invention include the decoupling of the torsional movement of the vehicle body from the immediate bearing installation of the drive aggregate without influencing the coupling in the vertical direction by way of the laterally outwardly disposed engine bearing supports. This is of advantage insofar as the vertical dynamic spring stiffness of the engine bearing supports does not have to be reduced thereby, which would entail a strong deterioration of the driving comfort. The center bearing effecting the decoupling has such a characteristic that it possesses a considerably greater dynamic stiffness in the radial load direction than the laterally outwardly disposed bearings in their vertical load directions. As a result thereof, the vertical coupling, as before, continues to be determined by the outer engine bearing supports. As a result of this construction of the center bearing element, the cross bearer can pivot within certain limits about the aggregate which stands nearly quiet as seismic mass.

Thus with predetermined lateral outwardly disposed bearing supports for the drive aggregate, a refitting can take place by means of the center bearing element in accordance with the present invention for decoupling torsional movements without thereby influencing the installation conditions of the drive aggregate with respect to the frame structure of the vehicle.

Aggregate vibrations, respectively, cross-bearer vibrations are damped functionally correctly by way of a damper or absorber between the cross-bearer and the bracket receiving the drive aggregate, whereby this damping is superimposed on the torsional movement.

These and other objects, features and advantages of the present invention will become more apparent from the following description when taken in connection with the accompanying drawing which shows, for purposes of illustration only, one embodiment in accordance with the present invention, and wherein.

Figure 1:
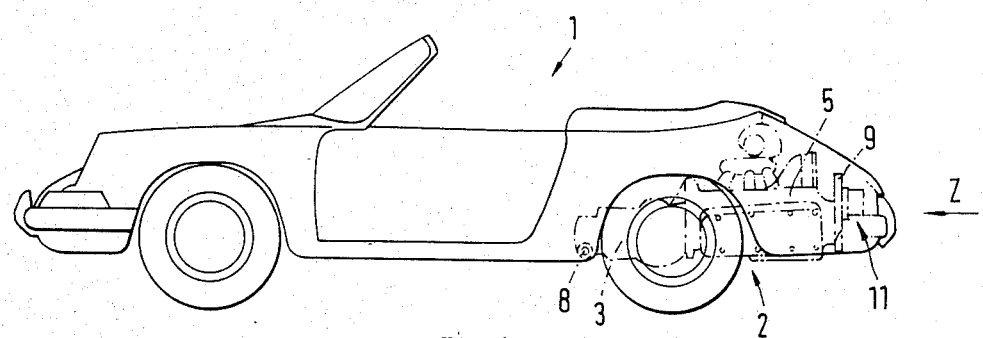
FIG. 1 is a side view of a motor vehicle of convertible type of construction with a schematically indicated rear drive aggregate.

Referring now to the drawing wherein like reference numerals are used throughout the various views to designate like parts, the motor vehicle generally designated by reference numeral 1 is constructed as a convertible and includes a drive aggregate generally designated by reference numeral 2 arranged in the rear thereof. The transmission 3 of the drive aggregate 2 is supported in a forward bearing installation generally designated by reference numeral 4 and the engine 5 of the drive aggregate in a rear bearing installation generally designated by reference numeral 6.

The forward bearing installation 4 includes two elastic bearings 7 at a rear axle cross tube 8, which are connected with the housing of the transmission 3. These bearings 7 are preferably arranged in an area low in vibrations, i.e., in a vibration node or null point of the overall system in order that an additional vibration excitation of the drive aggregate 2 is avoided.

The rear bearing installation 6 includes a cross-bearer 9 which is supported at the body structure of the vehicle 1 by way of lateral outwardly disposed elastic bearings 10. A bracket 12 is secured to this cross-bearer 9 under interposition of at least one dynamic decoupling device generally designated by reference numeral 11 while the bracket 12, in turn, is again rigidly connected with the engine 5 of the aggregate 2.

Figure 2:
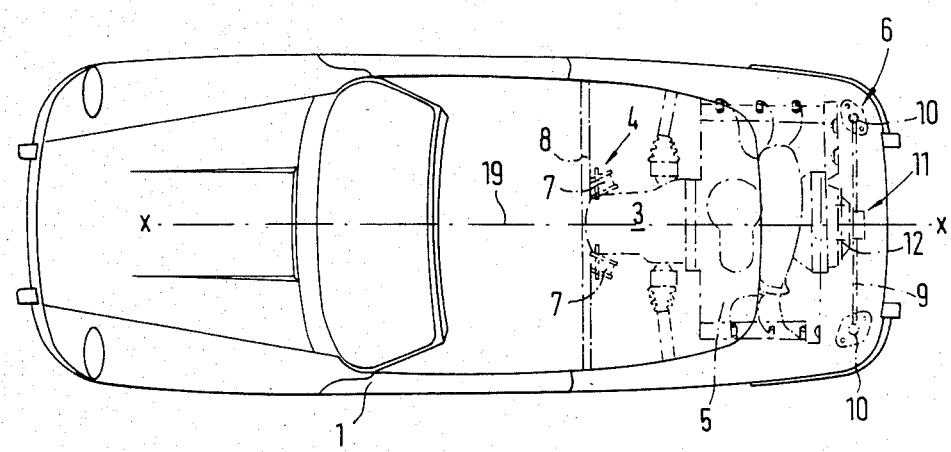
FIG. 2 is a plan view on FIG. 1.

This decoupling installation 11 includes a bearing element 13 (FIG. 4) arranged between the lateral bearings 10 (FIG. 2) in the main inertia axis 19 of the movement to be decoupled. In the illustrated embodiment, the inertia axis of the movement to be decoupled extends in the longitudinal center plane x—x of the vehicle 1 and preferably through the bearing element 13 (FIG. 4).

Figure 4:
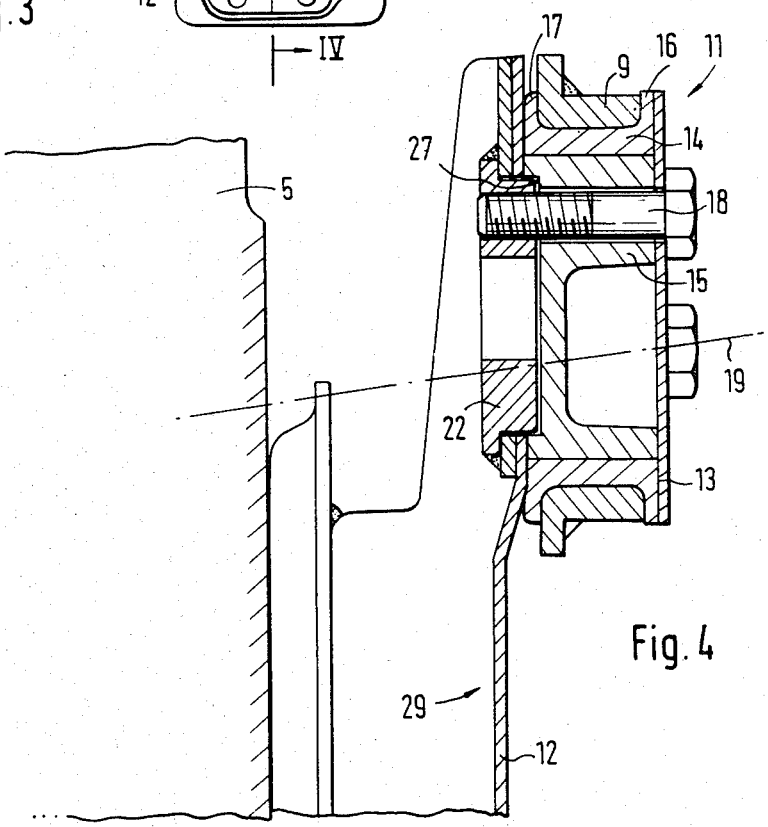
FIG. 4 is a cross-sectional view, on an enlarged scale, taken along line IV—IV of FIG. 3.

The bearing element 13 essentially includes an elastic sleeve 14 having a defined characteristic and of a centrally vulcanized-in bearing core 15 (FIG. 4). For the connection with the cross-bearer 9, the bearing element 13 has a U-shaped cross section in its circumferential area. The annular beads 16 and 17 of the elastic sleeve 14, which are formed thereby, effect a clamping action fixing the bearing element 13 in the cross bearer 9. Simultaneously therewith, the annular beads 16 and 17 serve as axial abutments for the bracket 12.

The bearing core 15 serves for the secure connection of the bearing element 13 with the bracket 12, whereby the bearing core 15 is vulcanized into the sleeve 14 and is fixed at the bracket 12 by way of bolts 18.

Figure 3:
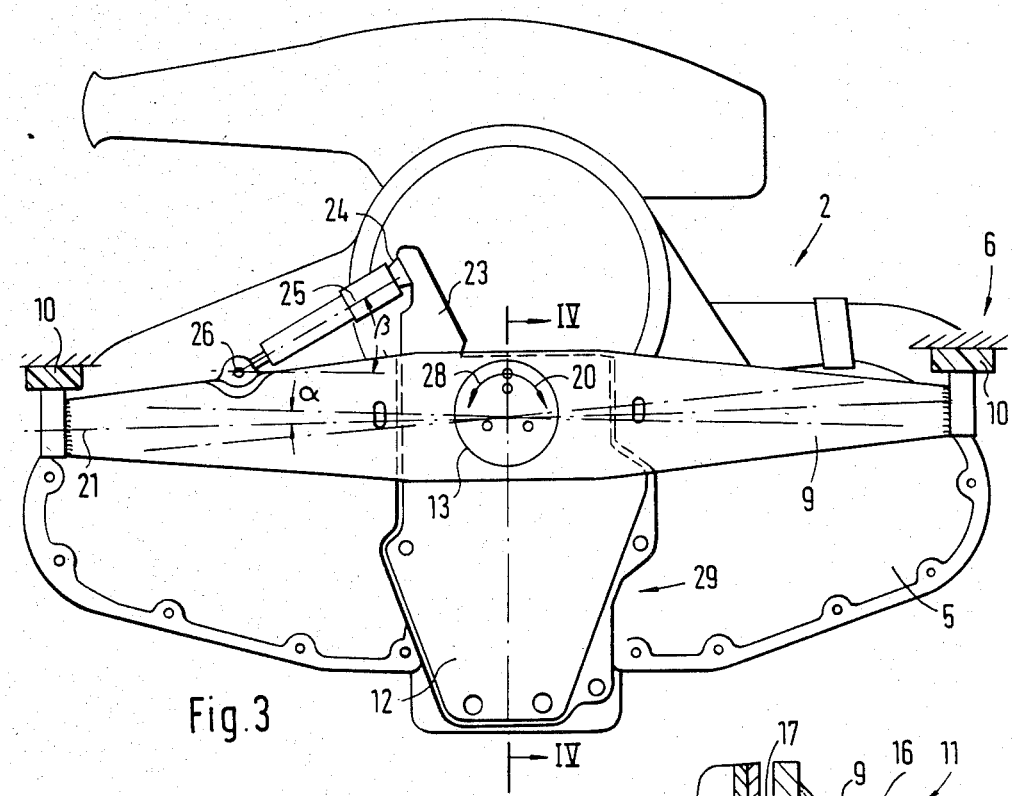
FIG. 3 is a rear elevational view on an enlarged scale, of the vehicle according to FIG. 1, as seen in the direction of arrow Z in FIG. 1.

For purposes of decoupling the vehicle body from the drive aggregate 2 during a torsional movement, the bearing element 13 is constructed so as to be torsionally soft in the direction of arrows 20 and 28 (FIG. 3). However, it possesses a radial stiffness which is larger than the vertical and horizontal stiffness of the remaining bearings 7 and 10 of the drive aggregate 2. In particular, the bearing element 13 is to be torsionally soft during a relative movement of the cross-bearer 9 from its horizontal plane 21 up to and including an angle $\alpha = 3°$. The deflection movement of the cross bearer 9 during torsional vibrations is represented by the arrows arranged pairwise.

As shown more particularly in FIG. 4, the bracket 12 includes a retaining element 22 which engages form-lockingly into an end face recess 27 of the bearing core 15 and is fixed by way of the bolts 18.

An area 29 (FIGS. 3 and 4) of the bracket 12 extends underneath the bearing element 13 and the cross bearer 9, and is secured to the engine 5 by means of bolts. A support arm 23 is provided at the bracket 12 above the bearing element 13 and the cross bearer 9, which forms an upper bearing support 24 for the damper or absorber 25 which is supported at the cross-bearer 9 by way of a bearing support 26. The shock absorber 25 is inclined relative to the cross bearer 9 at an angle beta$\beta$ of about 30° to about 150° and cooperates with the decoupling installation 11 in such a manner that a damping is effected which is superimposed on the relative movement of the body. The pivotal connection of the damper or absorber 25 at the cross bearer 9 and at the bracket 12 takes place at a relatively large distance to the longitudinal axis of the bearing element 13 integrated in the cross bearer 9.

Tests for the bearing elements 13 have indicated that in a vehicle of the convertible type of construction with a rear engine, two particularly distinct natural body vibrations occur. They are a torsional vibration about the vehicle longitudinal axis at about 11 Hz and a flexural vibration about the vehicle cross axis at about 17 Hz. The natural torsional vibration of the body structure at about 11 Hz is critical in particular for the aggregate bearing support. At that frequency, the body in the vehicle rear section already twists about the nearly rigid drive aggregate and seeks to twist the same. Since the largest vibrational amplitudes are located in the vehicle rear section area whereas the location of the transmission bearing support at the rear axle cross tube is disposed approximately in the nodes of the torsional vibrations, the occurring torsional moment is introduced by way of the hard engine bearing support nearly completely into the engine by way of the connecting place cross bearer/bracket. The bearing element 13 with its defined characteristic enables the critical torsional movements of the body, in this case, of the vehicle rear section to be decoupled completely from the drive unit.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A vibration-damped suspension for a drive aggregate of a vehicle in a body structure comprising first bearing support means arranged in a forward area of the drive aggregate and further bearing support means arranged in a rear area of the drive aggregate, the further bearing support means including a cross bearer means for supporting an engine of the drive aggregate, dynamic decoupling means interconnecting the cross bearer means and a bracket means secured to said engine, said vibration damped suspension thereby retaining the engine in such a manner that the decoupling means permits relative movement of the vehicle body independently of and in a defined manner relative to the drive aggregate.

2. A suspension according to claim 1, wherein further decoupling means includes a further bearing element having an elastic sleeve with a central vulcanized-in bearing core, said bearing core being connected with the bracket means by way of fastening means, and the sleeve being clampingly retained in the cross bearer means.

3. A suspension according to claim 2, wherein the decoupling means cooperates with a shock absorber means interconnecting the cross bearer means and the bracket means.

4. A suspension according to claim 3, wherein the bearing element is arranged in the main inertia axis of the movement to be decoupled.

5. A suspension according to claim 4, the main inertia axis extends in the center longitudinal plane of the vehicle during torsional vibrations.

6. A suspension according to claim 3, wherein the bearing element is constructed torsionally relatively soft but possesses a radial stiffness which is greater than the vertical and horizontal stiffness of other bearing means of the drive aggregate.

7. A suspension according to claim 6, wherein the bearing element is torsionally soft during a relative movement of the cross bearer means out of the horizontal plane up to an angle $\alpha =$ to and including 3°.

8. A suspension according to claim 6, wherein the sleeve of the bearing element is constructed U-shaped in cross section along the circumference and includes an annular bead means, by way of which the bearing element is clampingly retained in the cross bearer means.

9. A suspension according to claim 8, wherein the annular bead means form an axial abutment for the bracket means.

10. A suspension according to claim 8, wherein the pivotal connection of the shock absorber means at the cross bearer means and at the bracket means takes place at a relatively large distance from the longitudinal axis of the bearing element integrated into the cross-bearer means.

11. A suspension according to claim 8, wherein the bearing core includes an end-face recess, into which a retaining means connected with the bracket means engages form-lockingly, said retaining means being connected with the bearing core by way of bolts.

12. A suspension according to claim 8, wherein the braceket means receives the engine below the cross bearer means by way of fastening bolts and a support arm is provided above the cross bearer means for the bearing support of the shock absorber means.

13. A suspension according to claim 12, wherein the support arm projects beyond the cross bearer means in such a manner that the shock absorber means is inclined relative to the cross bearer means at an angle of about 30° to about 150°.

14. A suspension according to claim 1, wherein the decoupling means cooperates with a shock absorber means which interconnects the cross bearer means and the bracket means.

15. A suspension according to claim 2, wherein the bearing element is arranged in the main inertia axis of the movement to be decoupled.

16. A suspension according to claim 2, wherein the bearing element is constructed torsionally relatively soft but possesses a radial stiffness which is greater than the vertical and horizontal stiffness of other bearing means of the drive aggregate.

17. A suspension according to claim 2, wherein the bearing element is torsionally soft during a relative movement of the cross-bearer means out of the horizontal plane up to and including an angle $\alpha=3°$.

18. A suspension according to claim 2, wherein the sleeve of the bearing element is constructed U-shaped in cross section along the circumference and includes annular bead means, by way of which the bearing element is clampingly retained in the cross bearer means.

19. A suspension according to claim 18, wherein the annular bead means form each an axial abutment for the bracket means.

20. A suspension according to claim 14, wherein connection of the shock absorber means at the cross bearer means and at the bracket means takes place at a relatively large distance from the longitudinal axis of the bearing element integrated into the cross-bearer means.

21. A suspension according to claim 2, wherein the bearing core includes an end-face recess, into which a retaining means connected with the bracket means engages form-lockingly, said retaining means being connected with the bearing core by way of bolts.

22. A suspension according to claim 14, wherein the bracket means receives the engine below the cross-bearer means by way of fastening bolts and a support arm is provided above the cross-bearer means for the bearing support of the shock absorber means.

23. A suspension according to claim 22, wherein the support arm projects beyond the cross-bearer means in such a manner that the shock absorber means is inclined relative to the cross-bearer means at an angle $\beta$ of about 30° to about 150°.

* * * * *